US010990321B2

(12) United States Patent
La Fratta et al.

(10) Patent No.: US 10,990,321 B2
(45) Date of Patent: Apr. 27, 2021

(54) MEMORY SUB-SYSTEM FOR SUPPORTING DETERMINISTIC AND NON-DETERMINISTIC COMMANDS BASED ON COMMAND EXPIRATION AND THE STATE OF THE INTERMEDIATE COMMAND QUEUE

(71) Applicant: Micron Technology, Inc., Boise, ID (US)

(72) Inventors: Patrick A. La Fratta, McKinney, TX (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 49 days.

(21) Appl. No.: 16/280,607

(22) Filed: Feb. 20, 2019

(65) Prior Publication Data

US 2020/0264804 A1  Aug. 20, 2020

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
CPC ..... G06F 3/0659; G06F 3/0604; G06F 3/0673
USPC ................. 711/105, 167, 154, 103
See application file for complete search history.

(56) References Cited

U.S. PATENT DOCUMENTS

2005/0240649 A1* 10/2005 Elkington ............... G06F 3/061
  709/200
2011/0258353 A1  10/2011 Wang
2015/0095605 A1   4/2015 Roberts et al.
2016/0371014 A1  12/2016 Roberts
2017/0177240 A1*  6/2017 Yu ........................ G06F 12/0866
2018/0059933 A1   3/2018 Helmick et al.
2018/0059976 A1*  3/2018 Helmick ............. G06F 12/0246
(Continued)

FOREIGN PATENT DOCUMENTS

KR    20150142212   12/2015
WO    2020171955    8/2020

OTHER PUBLICATIONS

"International Application Serial No. PCT US2020 016816, International Search Report dated Jun. 18, 2020", 3 pgs.
(Continued)

*Primary Examiner* — Yaima Rigol
*Assistant Examiner* — Edward Waddy, Jr.
(74) *Attorney, Agent, or Firm* — Schwegman Lundberg & Woessner, P.A.

(57) ABSTRACT

Commands in a command queue are received and scheduled. For each of the commands, scheduling includes determining an age of a command based on an entrance time of the command in the command queue. When the age of the command satisfies a first threshold, marking all other commands in the command queue as not issuable when the command is a deterministic command, and marking all other commands in the command queue as not issuable when the command is a non-deterministic command and the intermediate command queue is not empty. Scheduling the command further includes determining whether the command is a read command and marking the command as not issuable when the command is a non-deterministic read command and the intermediate command queue is empty.

20 Claims, 6 Drawing Sheets

(56) References Cited

U.S. PATENT DOCUMENTS

2019/0236029 A1* 8/2019 Butcher .............. G06F 12/0246
2019/0272117 A1* 9/2019 Feldman ................ G06F 3/0674
2019/0278515 A1* 9/2019 Wells .................... G06F 3/0659

OTHER PUBLICATIONS

"International Application Serial No. PCT US2020 016816, Written Opinion dated Jun. 18, 2020", 4 pgs.

* cited by examiner

MEMORY SUB-SYSTEM FOR SUPPORTING DETERMINISTIC AND NON-DETERMINISTIC COMMANDS BASED ON COMMAND EXPIRATION AND THE STATE OF THE INTERMEDIATE COMMAND QUEUE

TECHNICAL FIELD

Embodiments of the disclosure relate generally to memory sub-systems, and more specifically, relate to memory sub-systems that support deterministic and non-deterministic commands based on command expiration and the state of the intermediate command queue while reducing latency, energy consumption, and on-chip buffer requirements.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
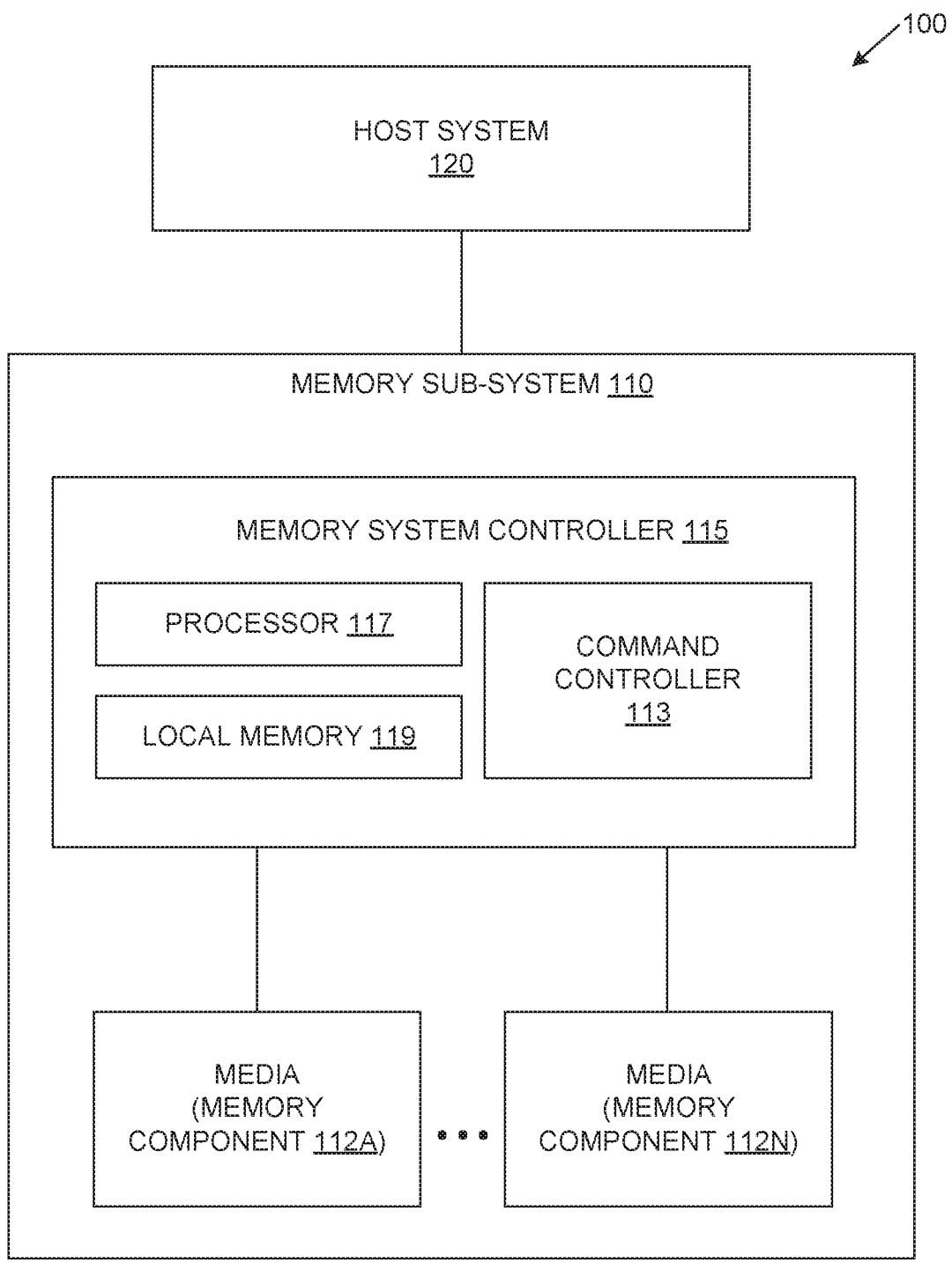
FIG. 1 illustrates an example computing environment that includes a memory sub-system, in accordance with some embodiments of the present disclosure.

Aspects of the present disclosure are directed to a memory sub-system that supports deterministic and non-deterministic commands to memory components. A memory sub-system is also hereinafter referred to as a "memory device". An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. The multiple memory components can be volatile memory components, non-volatile memory components, or a combination of such. Commands to volatile memory components can be referred to as deterministic commands while commands to non-volatile memory components can be referred to as non-deterministic commands.

Conventional memory controllers support the out-of-order completion of commands to allow for different volatile memory components (e.g., dynamic random access memory (DRAM)) types connected to different ranks of the same channel. However, recent protocols for non-volatile memory components, such as non-volatile dual in-line memory module protocol (NVDIMM-P), enable the connection of non-volatile memory components alongside the volatile memory components (e.g., DRAM) on the same channel. When scheduling commands using protocols like NVDIMM-P, non-deterministic read commands issued to the same rank can return out-of-order responses such that the conventional memory controllers cannot support these recent protocols for non-volatile memory components.

Moreover, in an effort to reduce the latency experienced by the host system, the memory sub-system can implement command scheduling policies to prioritize certain commands. One example of a command scheduling policy is first-ready, first-come, first-serve (FRFCFS) policy with read priority. However, for a conventional memory sub-system that includes at least one rank of non-volatile memory utilizing a non-deterministic protocol like NVDIMM-P, the use of conventional command scheduling policies such as FRFCFS policy with read priority can result in poor performance. For example, an XREAD command is a read command to an NVDIMM rank or in other words, the XREAD command is a non-deterministic read command. In response to a non-deterministic read command, prior to sending the data associated with the non-deterministic read command, the non-volatile memory component sends the intermediate command (e.g., RSP_N command) that indicates that data is ready for transmission. The intermediate command (e.g., RSP_N command) is a read ready response from the non-volatile memory components. When the intermediate command is received, a send command is sent to indicate to the non-volatile memory component to transmit the data that is ready for transmission. Accordingly, an FRFCFS policy with read priority can be halted by the pending non-deterministic read commands such as XREAD commands that have not yet received the intermediate command from the non-volatile memory components. Further, when the conventional memory sub-system is configured with one or more ranks of volatile memory (e.g., DRAM) and one or more ranks of non-volatile memory sharing the same channel, there can often be a large discrepancy in the latency of requests accessing the different ranks. This discrepancy in latency can lead to additional implications with command scheduling. The use of conventional memory controller architectures designed for use with memory components having more similar timing characteristics will often result in idle bus time and drastic increases in average and maximum latency of requests to specific ranks.

Aspects of the present disclosure address the above and other deficiencies by having a memory sub-system that includes extensions to the order buffer arbiter and the command scheduler of the memory controller. Such a memory sub-system can improve the performance of memory controllers with ranks of volatile and non-volatile memory components sharing a same channel.

The extensions to the order buffer arbiter in this memory sub-system include using configuration parameters including a maximum limit and a contention limit for each input port of the order buffer arbiter. The maximum limit for a given port is the maximum number of order buffer entries allowed for requests coming from that given port. The contention limit for that given port determines the maximum number of order buffer entries allowed for requests coming from that given port when there are incoming requests at other ports besides that given port. Using these parameters, the order buffer arbiter can adapt the reservation of order buffer entries dynamically based on whether there is traffic at another port. To reduce latency, this feature can be used to allow traffic to a rank, such as NVDIMM, with relatively high latency to be limited only when there is incoming traffic to another rank, such as DRAM, with relatively low latency. Further, in the embodiment, by using a unified order buffer for NVDIMM-P and DRAM commands and setting a limit on the amount of space available to a rank, the order buffer size can be reduced without significantly affecting performance. A reduction in size of the order buffer reduces the on-chip buffer requirements. Additionally, the activation and pre-charge energy consumption associated with this memory controller architecture is also minimized.

The extensions to the command scheduler of the memory controller include modifications to the handling of command expiration and read priority by taking into account the destination device type (e.g., non-volatile or volatile) when prioritizing expired commands or read commands. Given that NVDIMM-P read requests involve two commands including the non-deterministic read command (e.g., XREAD command) and the send command, where the send command cannot be sent before the intermediate command is received, a prioritization scheme that ignores the state of the pending read commands can result in poor performance when the pending XREAD command blocks other commands before the XREAD command has received an intermediate command. To address these issues and reduce latency, the extensions to the command scheduler of the memory controller gates command prioritization of read commands due to both expiration and read priority based on whether the intermediate command queue (e.g., RSP_N queue) is empty. The intermediate command queue receives and stores the intermediate commands from the non-volatile memory components. Specifically, when the intermediate command queue is empty the read commands are flagged as not issuable to allow other commands to proceed until an intermediate command is received in the intermediate command queue. Accordingly, such a memory sub-system reduces latency, energy consumption and on-chip buffer requirements.

FIG. 1 illustrates an example computing environment 100 that includes a memory sub-system 110, in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system 110 is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system 110).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a command controller 113 that can be used to store data at a particular memory component based on a corresponding usage threshold. In some embodiments, the controller 115 includes at least a portion of the command controller 113. For example, the controller 115 can include a processor 117 (processing device) configured to execute instructions stored in local memory 119 for performing the operations described herein. In some embodiments, the command controller 113 is part of the host system 120, an application, or an operating system.

The command controller 113 can support deterministic and non-deterministic commands while reducing latency, energy consumption, and on-chip buffer requirements. In order to reduce latency, energy consumption and on-chip buffer requirements, the command controller 113 can perform order buffer arbitration by dynamically establishing the maximum number of entries associated with a port receiving non-deterministic commands based on whether there is traffic at a port receiving deterministic commands. The command controller 113 can then select commands from alternating ports. The command controller 113 can also schedule the commands in a command queue by taking into account destination device type or protocol when prioritizing expired commands or read commands. Further details with regards to the operations of the command controller 113 are described below.

Figure 2:
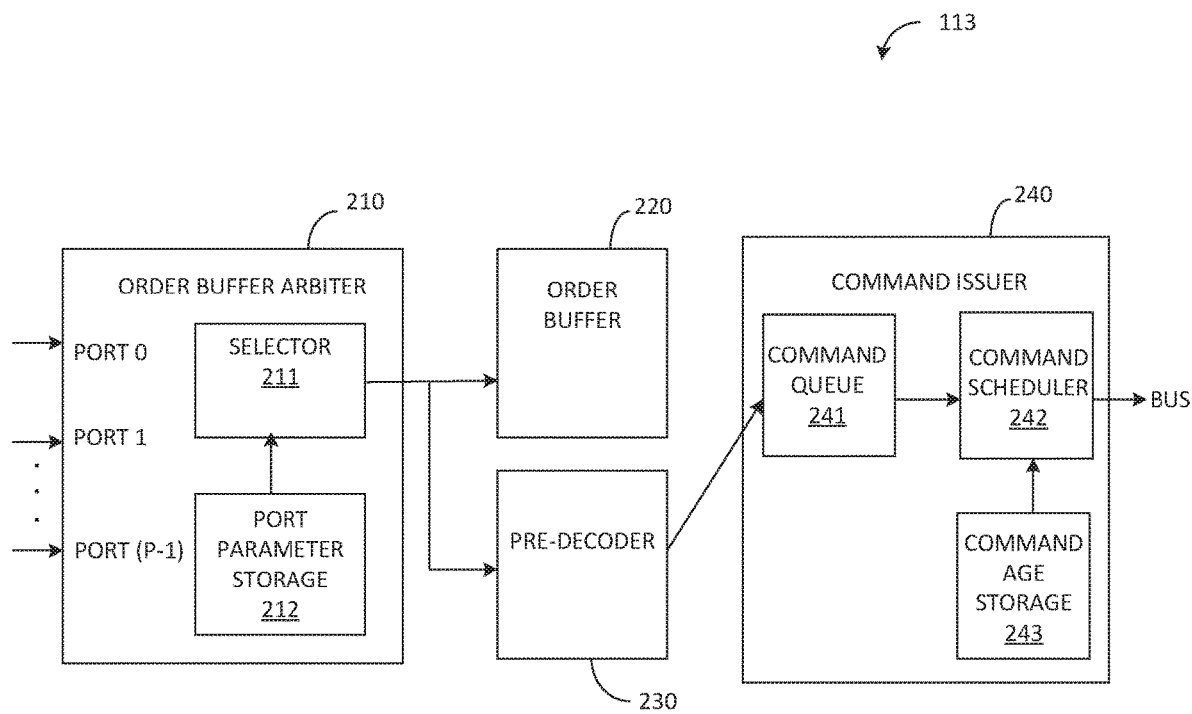
FIG. 2 illustrates an example of the details of the command controller, in accordance with some embodiments of the present disclosure.

FIG. 2 illustrates an example of the details of the command controller 113 in accordance with some embodiments of the present disclosure. As shown in FIG. 2, the command controller 113 can include an order buffer arbiter 210, an order buffer 220, a pre-decoder 230, and a command issuer 240. The order buffer arbiter 210 can include a selector 211 and a port parameter storage 212. The command issuer 240 can include a command queue 241, command scheduler 242 and command age storage 243. In one example embodiment, the port parameter storage 212 and the command age storage 243 can be included in local memory 119 in FIG. 1.

The order buffer 220 can be one or more order buffers that hold outstanding requests or commands to different memory components 112A-112N including volatile memory components and non-volatile memory components. The volatile memory component can be DRAM and the non-volatile memory component can be an NVDIMM. The non-deterministic commands can be NVDIMM-P commands and deterministic commands can be DRAM commands. The order buffer 220 can be one unified buffer that holds the outstanding requests or commands to the different types of memory components. In one example embodiment, one or more input ports associated with different ranks or types of memory components can share the unified order buffer and the order buffer arbiter 210 determines the order in which the incoming requests or commands are inserted into the order buffer 220 that is shared between the input ports (e.g., ports 0 to p−1, where p>2). In one example embodiment, non-deterministic commands can be received at a first port and deterministic commands can be received at a second port.

In FIG. 2, the port parameter storage 212 in the order buffer arbiter 210 stores port configuration parameters for each port including a maximum limit and a contention limit. The maximum limit for a given port a determines the maximum number of order buffer entries allowed for requests coming from port a. The contention limit for port a determines the maximum number of order buffer entries allowed for requests coming from port a when there are incoming requests at other ports besides port a. The order buffer arbiter 210 adapts the reservation of order buffer entries dynamically based on whether there is traffic at other ports. For example, the order buffer arbiter 210 can allow traffic to a rank, such as an NVDIMM rank, with relatively high latency to be limited only when there is incoming traffic to another rank, such as DRAM, with relatively low latency. In one example embodiment, the order buffer arbiter 210 sets the maximum number of order buffer entries allowed for requests coming from port a to the maximum limit when there is no traffic at other ports besides port a and sets the maximum number of order buffer entries allowed for requests coming from port a to the contention limit when there is traffic at other ports besides port a. Once the order buffer arbiter 210 dynamically sets the maximum number of order buffer entries allowed for requests coming from each of the ports, the selector 211 orders and selects the commands to be inserted into the order buffer 220. The pre-decoder 230 pre-decodes the commands from the order buffer 220 or from the selector 211 and sends the commands to the command queue 241.

The command queue 241 receives the commands that include non-deterministic commands and deterministic commands. The command scheduler 242 schedules the commands in the command queue 241 to be issued to the memory components 112A-112N via the bus. The command age storage 243 stores age thresholds for each of the ports (e.g., port 0 to port p–1). The age thresholds for each of the ports are a predetermined maximum command age at which the command is expired. The command age is based on the duration of time the command has been queued in the command queue 241. While a command that has a command age that is greater than the predetermined maximum command age such that it is deemed to have reached its command expiration time should be prioritized over all other commands in the command queue 241, the command scheduler 242 can also take into account the command destination device type or protocol (e.g., whether the command is non-deterministic or deterministic) in scheduling the command. Similarly, although command scheduling policies like first-ready, first-come, first-serve (FRFCFS) policy with read priority would prioritize read commands, the command scheduler 242 takes into account the command destination device type or protocol in scheduling the read command.

Figure 3:
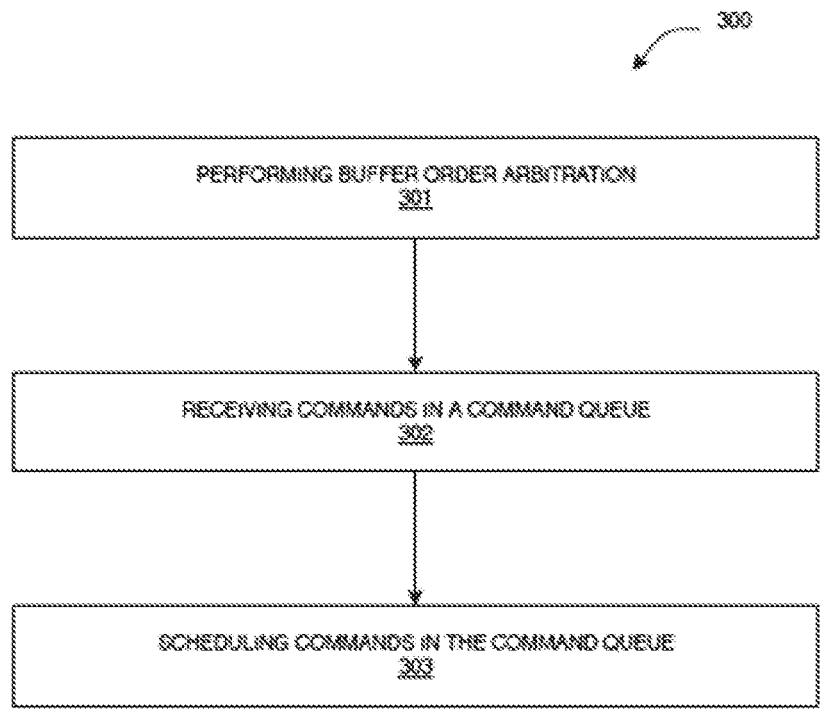
FIG. 3 is a flow diagram of an example method to support deterministic and non-deterministic commands, in accordance with some embodiments of the present disclosure.

FIG. 3 is a flow diagram of an example method 300 to support deterministic commands and non-deterministic commands, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 301, the processing device performs buffer order arbitration. As discussed above, the order buffer 220 can be one or more order buffers that hold outstanding requests or commands to different memory components 112A-112N including volatile memory devices like DRAM and non-volatile memory devices like NVDIMM. The order buffer 220 can be one unified buffer that holds the outstanding requests or commands to the different types of memory components. In one example embodiment, one or more input ports associated with different ranks or types of memory components can share the unified order buffer. At operation 301, the processing device uses configuration parameters including a maximum limit and a contention limit for each input port of the order buffer arbiter 210 to adapt the reservation of order buffer entries dynamically based on whether there is traffic at another port. The processing device can then determine the order in which the incoming requests or commands are inserted into the order buffer 220 that is shared between the input ports (e.g., ports 0 to p–1, where p>2). In one example embodiment, non-deterministic commands can be received at a first port and deterministic commands can be received at a second port. Further details of operation 301 are discussed with reference to FIG. 4.

At operation 302, the processing device receives the commands in a command queue 241. The commands received in the command queue 241 can include non-deterministic commands and deterministic commands. The commands can be received in the command queue 241 from the order buffer 220 or from the pre-decoder 230.

At operation 303, the processing device schedules the commands in the command queue 241. As discussed above, the processing device takes into account the type of command when prioritizing expired commands or read commands during scheduling to improve the performance of memory controllers with ranks of volatile and non-volatile memory sharing a channel. Further details of operation 303 are discussed with reference to FIG. 5.

Figure 4:
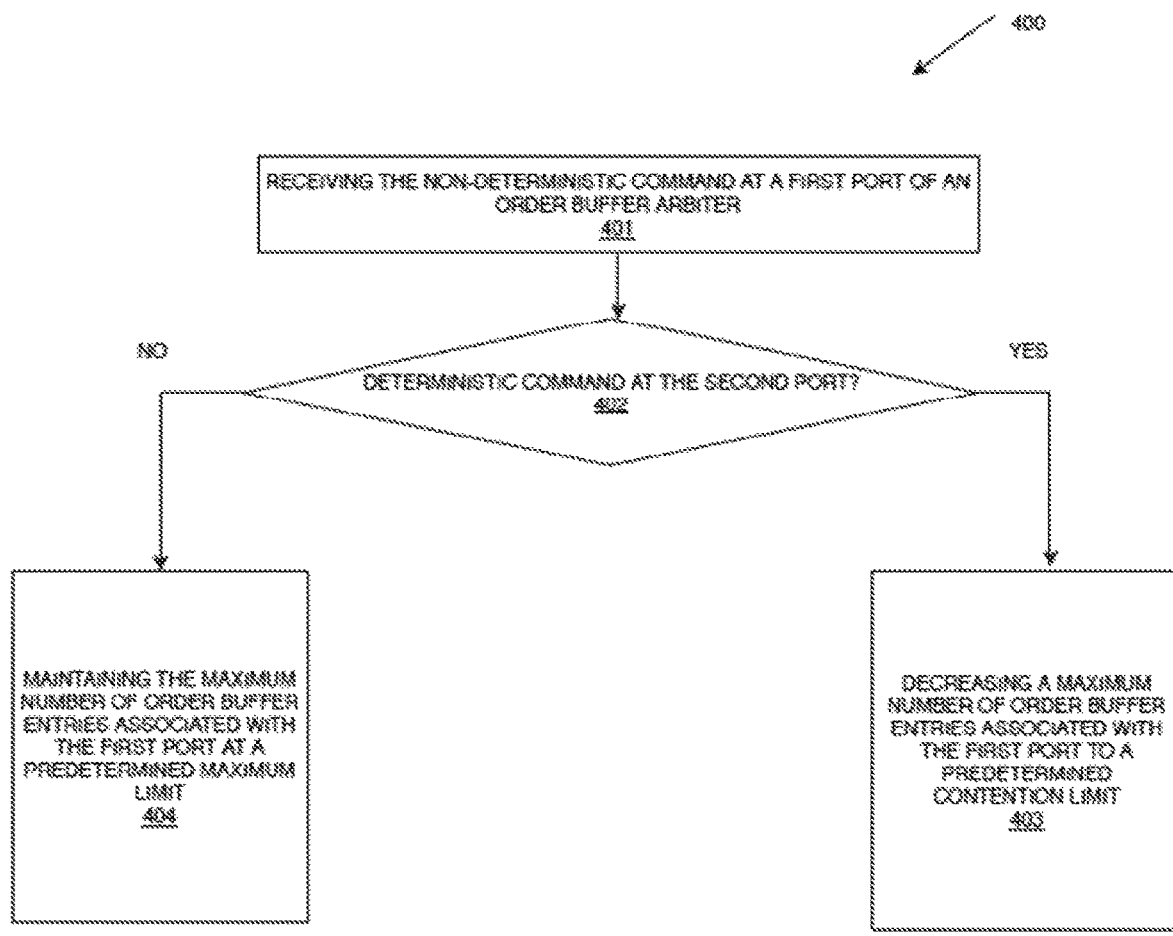
FIG. 4 illustrates an example of performing order buffer arbitration (operation 301 in FIG. 3) in a method to support deterministic and non-deterministic commands, in accordance with some embodiments of the present disclosure.

FIG. 4 illustrates an example of performing order buffer arbitration (operation 301 in FIG. 3) in a method to support deterministic and non-deterministic commands in accordance with some embodiments of the present disclosure.

To perform order buffer arbitration, at operation 401, the processing device receives the non-deterministic command at a first port (e.g., port 0) of an order buffer arbiter 210. At operation 402, the processing device determines if there is any outstanding traffic at the other ports. For example, the processing device can determine whether there is a deterministic command at a second port of the order buffer arbiter 210. In some example embodiments, the order buffer arbiter 210 receives commands for different ranks of volatile and non-volatile memory at different ports, respectively. For each port, the processing device can use configuration parameters including the maximum limit and the contention limit, to adapt the number of order buffer entries that are reserved for each port based on the traffic at other ports. As shown in FIG. 4, when there is a deterministic command at the second port, at operation 403, the processing device decreases the maximum number of order buffer entries associated with the first port to a predetermined contention limit. When there is no deterministic command at the second port, at operation 404, the processing device maintains the maximum number of order buffer entries associated with the first port at a predetermined maximum limit. The predetermined maximum limit and the predetermined contention limit are different. The first port's predetermined maximum limit is higher than the first port's predetermined contention limit. The processing device can thus allow traffic to the first port that is receiving NVDIMM-P commands, with relatively high latency to be limited only when there is incoming traffic to the second port that is receiving DRAM commands, with relatively low latency.

Figure 5:
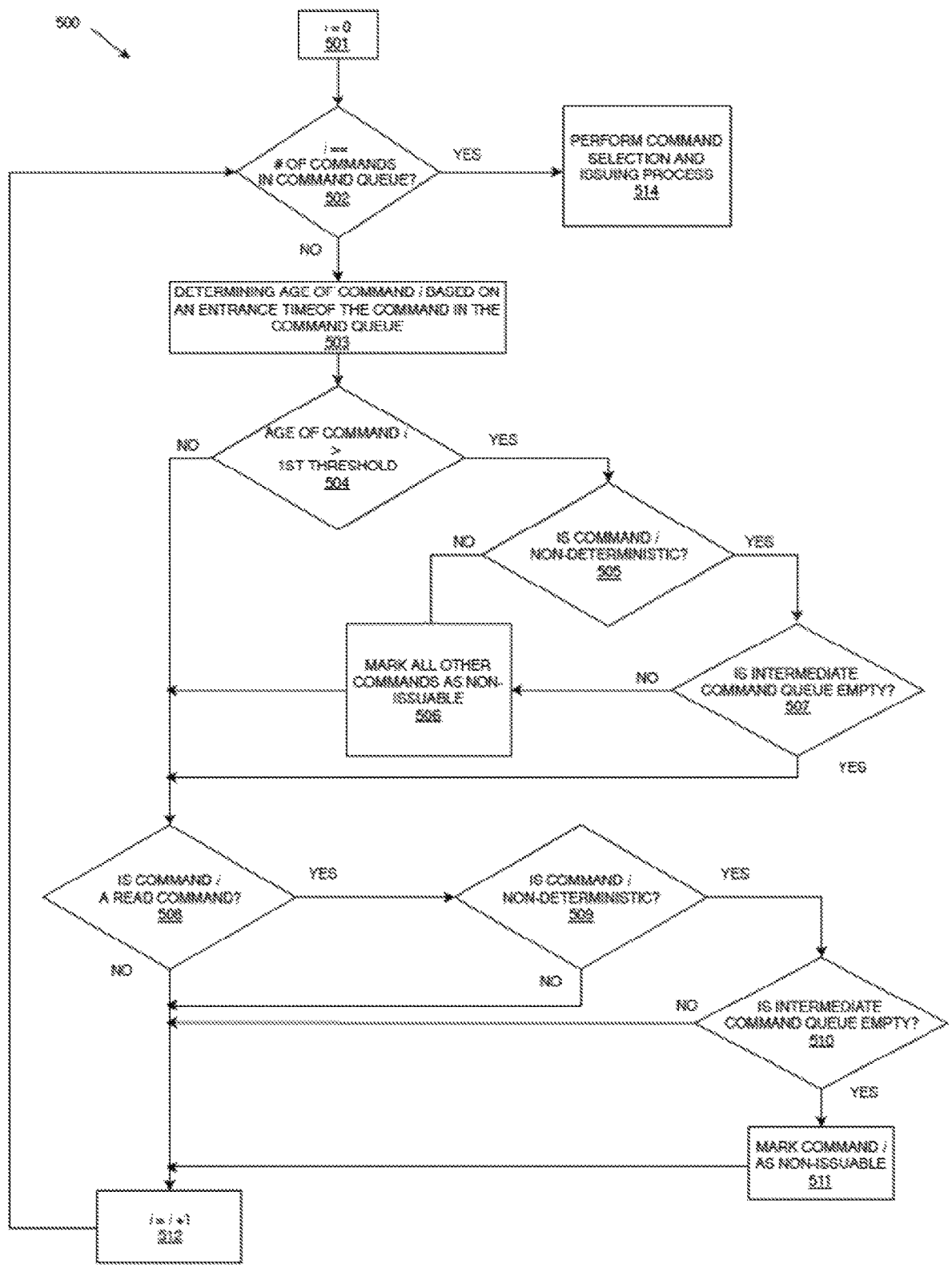
FIG. 5 illustrates an example of scheduling the commands in the command queue (operation 303 in FIG. 3) in a method to support deterministic and non-deterministic commands, in accordance with some embodiments of the present disclosure.

FIG. 5 illustrates an example of scheduling the commands in the command queue 241 (operation 303 in FIG. 3) in a method to support deterministic and non-deterministic commands in accordance with some embodiments of the present disclosure. To schedule the commands in the command queue 241, at operation 501, the processing device resets an index associated with the commands in the command queue 241 to 0. At operation 502, the processing device determines whether each of the commands have been considered and/or scheduled. The processing device may make this determination at operation 502 by comparing the index to the total number of commands in the command queue 241. If the index is equal to the total number of commands in the command queue 241, each of the commands have been considered and/or scheduled.

If the index is equal to the total number of commands in the command queue 241, at operation 514, the processing device performs a command selection process and issues the commands to the memory components accordingly.

If the index is not equal to the total number of commands in the command queue 241, at operation 503, the processing device determines the age of the command based on an entrance time of the command in the command queue 241.

At operation 504, the processing device determines if the age of the command is greater than a first threshold. The first threshold can be the maximum command age that is associated with a rank of the command. The maximum command age is a threshold parameter that establishes a limit on the amount of time that a read command will sit in the command queue 241 and be prevented from issuing by any other command on the same channel. The maximum command age establishes whether the command has reached its expiration time.

When the age of the command is not greater than a first threshold, the processing device proceeds to operation 508. When the age of the command is greater than a first threshold, at operation 505, the processing device determines whether the command is a non-deterministic command. For example, the processing device determines whether the command is directed to a non-volatile memory component such as NVDIMM. The processing device determines whether the command is a non-deterministic command and the state of the pending non-deterministic command to prevent the non-deterministic command from blocking other commands while waiting to receive the intermediate command (RSP_N).

If the command is not a non-deterministic command, at operation 506, the processing device marks all other commands in the command queue 241 as non-issuable and proceeds to operation 508. If the command is a non-deterministic command, at operation 507, the processing device determines whether the intermediate command queue is empty. The intermediate command queue is a queue that receives and stores intermediate commands from the non-volatile memory components. The processing device gates the command prioritization of expired commands based on whether the intermediate command queue is empty.

When the intermediate command queue is determined not to be empty, the processing device marks all other commands in the command queue 241 as non-issuable at operation 506 and proceeds to operation 508. When the intermediate command queue is determined to be empty, the processing device continues to operation 508. The processing device thus does not prioritize the expired non-deterministic command when the intermediate command queue is empty.

At operation 508, the processing device determines if the command is a read command. When the command is not a read command, the processing device proceeds to operation 512. When the command is a read command, at operation 509, the processing device determines whether the command is a non-deterministic command. The non-deterministic read requests include two commands (e.g., the non-deterministic read command, and the send command). The send command cannot be sent before the intermediate command is received. The processing device thus determines whether the command is a non-deterministic read command and the state of the pending non-deterministic read command to prevent the non-deterministic read command from blocking other commands while waiting to receive the intermediate command.

When the command is not a non-deterministic command, the processing device proceeds to operation 512. When the command is a non-deterministic command, at operation 510, the processing device proceeds to determine whether the intermediate command queue is empty. The processing device gates the command prioritization of read commands based on whether the intermediate (RSP_N) command queue is empty.

If the intermediate command queue is not empty, the processing device proceeds to operation 512. When the intermediate command queue is empty, at operation 511, the processing device marks the command as non-issuable and proceeds to operation 512. The processing device thus prevents the non-deterministic read command that is waiting to receive the intermediate command from blocking other commands by marking the non-deterministic read command as non-issuable when the intermediate command queue is empty. At operation 512, the processing device increments the index and proceeds back to operation 502.

Figure 6:
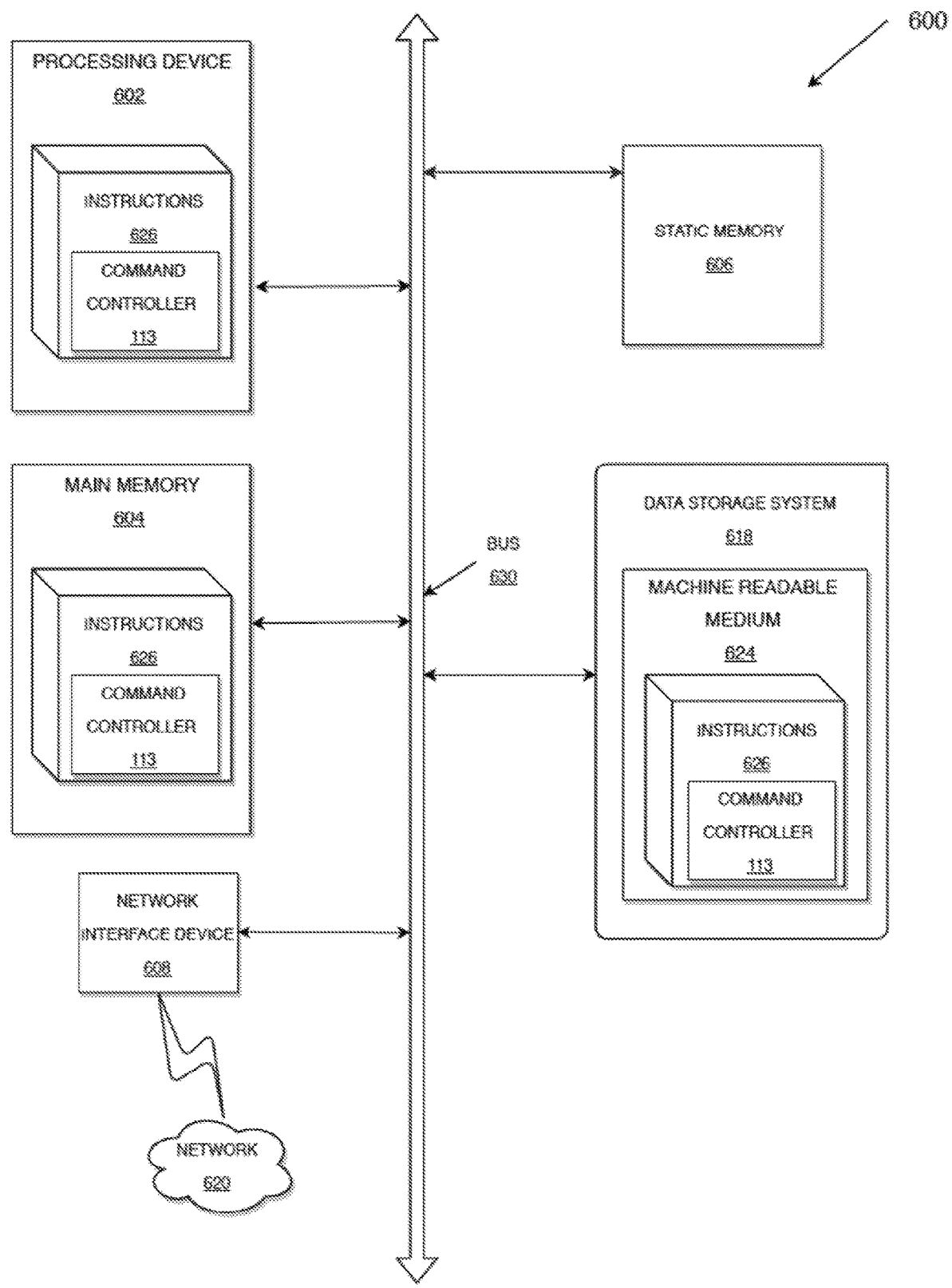
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command controller 113 of FIG. 1 to support deterministic and non-deterministic commands). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media 624. The machine-readable storage medium 624, data storage system 618, and/or main memory 604 can correspond to the memory sub-system 110 of FIG. 1.

In one embodiment, the instructions 626 include instructions to implement functionality corresponding to a command controller (e.g., the command controller 113 of FIG. 1) that supports deterministic and non-deterministic commands. While the machine-readable storage medium 624 is shown, in an example embodiment, to be a single medium, the term "machine-readable storage medium" should be taken to include a single medium or multiple media that store the one or more sets of instructions 626. The term "machine-readable storage medium" shall also be taken to include any medium that is capable of storing or encoding a set of instructions 626 for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system 600, or similar electronic computing device, that manipulates and transforms data represented as physical (electronic) quantities within the computer system 600's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions 626, each coupled to a computer system bus 630.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium 624 having stored thereon instructions 626, which can be used to program a computer system 600 (or other electronic devices) to perform a process according to the present disclosure. A machine-readable medium 624 includes any mechanism for storing information in a form readable by a machine (e.g., a computer). In some embodiments, a machine-readable (e.g., computer-readable) medium 624 includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory components; and
   a processing device operatively coupled with the plurality of memory components, the processing device configured to perform operations comprising:
      receiving a plurality of commands in a command queue, wherein the plurality of commands are directed to the plurality of memory components; and scheduling the plurality of commands in the command queue, wherein scheduling the commands comprises, for each of the plurality of commands:
determining an age of a command based on an entrance time of the command in the command queue,
when the age of the command satisfies a first threshold,
marking other commands in the command queue as not issuable when the command is a deterministic command, and
marking other commands in the command queue as not issuable when the command is a non-deterministic command and an intermediate command queue is not empty,
determining whether the command is a read command, and
marking the command as not issuable when the command is a non-deterministic read command and the intermediate command queue is empty.

2. The system of claim 1, wherein the memory components comprising a volatile memory component receiving deterministic commands and a non-volatile memory component receiving non-deterministic commands.

3. The system of claim 2, wherein the plurality of commands received in the command queue comprise non-deterministic commands and deterministic commands.

4. The system of claim 3, wherein the volatile memory component is a Dynamic Random-Access Memory (DRAM) and the non-volatile memory component is a Non-Volatile Dual In-Line Memory Module (NVDIMM), wherein the non-deterministic commands are NVDIMM-P commands, and deterministic commands are DRAM commands.

5. The system of claim 4, wherein the intermediate command queue receives an intermediate command indicating that data associated with the non-deterministic read command is ready for transmission, wherein the non-deterministic read command is an XREAD command.

6. The system of claim 1, wherein the processing device is configured to perform operations further comprising:
performing order buffer arbitration comprising:
receiving the non-deterministic command at a first port of an order buffer arbiter; and
adapting a maximum number of order buffer entries associated with the first port based on whether there is the deterministic command at a second port of the order buffer arbiter.

7. The system of claim 6, wherein the maximum number of order buffer entries associated with the first port is decreased to a predetermined contention limit associated with the first port when there is the deterministic command at the second port.

8. The system of claim 7, wherein deterministic commands are received at the second port of the order buffer arbiter.

9. The system of claim 8, wherein the maximum number of order buffer entries associated with the first port is set to a predetermined maximum limit associated with the first port when there is not the deterministic command at the second port.

10. The system of claim 9, the processing device configured to perform operations further comprising:
pre-decoding the deterministic commands and the non-deterministic commands from the order buffer arbiter, wherein the plurality of commands received in the command queue comprise the pre-decoded commands.

11. A method comprising:
receiving a plurality of commands in a command queue, wherein the plurality of commands are directed to a plurality of memory components; and
scheduling the plurality of commands in the command queue, wherein scheduling the commands comprises, for each of the plurality of commands:
determining an age of a command based on an entrance time of the command in the command queue,
when the age of the command satisfies a first threshold,
marking other commands in the command queue as not issuable when the command is a deterministic command, and
marking other commands in the command queue as not issuable when the command is a non-deterministic command and an intermediate command queue is not empty,
determining whether the command is a read command, and
marking the command as not issuable when the command is a non-deterministic read command and the intermediate command queue is empty.

12. The method of claim 11, wherein the plurality of commands received in the command queue comprise non-deterministic commands and deterministic commands, wherein the deterministic commands are commands to volatile memory components and the non-deterministic commands are commands to non-volatile memory components.

13. The method of claim 12, wherein the volatile memory component is a Dynamic Random-Access Memory (DRAM) and the non-volatile memory component is a Non-Volatile Dual In-Line Memory Module (NVDIMM), wherein the non-deterministic commands are NVDIMM-P commands, and deterministic commands are DRAM commands.

14. The method of claim 13, wherein the intermediate command queue receives an intermediate command indicating that data associated with the non-deterministic read command is ready for transmission, wherein the non-deterministic read command is an XREAD command.

15. The method of claim 11, further comprising:
performing order buffer arbitration comprising:
receiving the non-deterministic command at a first port of an order buffer arbiter, and
adapting a maximum number of order buffer entries associated with the first port based on whether there is the deterministic command at a second port of the order buffer arbiter.

16. The method of claim 15, the maximum number of order buffer entries associated with the first port is decreased to a predetermined contention limit associated with the first port when there is the deterministic command at the second port.

17. The method of claim 16, wherein deterministic commands are received at the second port of the order buffer arbiter.

18. The method of claim 17, wherein the maximum number of order buffer entries associated with the first port is set to a predetermined maximum limit associated with the first port when there is not the deterministic command at the second port.

19. The method of claim 18, further comprising:
pre-decoding the deterministic commands and the non-deterministic commands from the order buffer arbiter, wherein the plurality of commands received in the command queue comprise the pre-decoded commands.

20. At least one non-transitory machine-readable storage medium comprising instructions that, when executed by a processing device, cause the processing device to perform operations comprising:
- receiving a plurality of commands in a command queue, wherein the plurality of commands are directed to a plurality of memory components;
- scheduling the plurality of commands in the command queue, wherein scheduling the commands comprises, for each of the plurality of commands:
  - determining an age of a command based on an entrance time of the command in the command queue,
  - when the age of the command satisfies a first threshold,
    - marking other commands in the command queue as not issuable when the command is a deterministic command, and
    - marking other commands in the command queue as not issuable when the command is a non-deterministic command and an intermediate command queue is not empty,
  - determining whether the command is a read command, and
  - marking the command as not issuable when the command is non-deterministic read command and the intermediate command queue is empty.

* * * * *